United States Patent [19]

Powers et al.

[11] Patent Number: 4,905,348

[45] Date of Patent: Mar. 6, 1990

[54] DOUBLE-GATED EXTRUSION DIE FOR SAUSAGE LINKS

[75] Inventors: Richard G. Powers, Overland Park; Warren R. Schack, Leawood, both of Kans.

[73] Assignee: Marlen Research Corporation, Overland Park, Kans.

[21] Appl. No.: 283,291

[22] Filed: Dec. 12, 1988

[51] Int. Cl.⁴ .............................. A22C 7/00
[52] U.S. Cl. ........................ 17/32; 17/1 F; 17/34; 426/513; 425/589
[58] Field of Search .............. 17/32, 34, 33, 1 F; 425/461–464, 553, 589; 426/513

[56] References Cited

U.S. PATENT DOCUMENTS

| | | | |
|---|---|---|---|
| 2,013,610 | 9/1935 | Karpiloff | 17/32 |
| 3,063,842 | 11/1962 | Podebradsky | 99/109 |
| 3,287,761 | 11/1966 | Borsuk et al. | 17/32 |
| 3,421,178 | 1/1969 | Ammons et al. | 17/32 |
| 3,462,793 | 8/1969 | Sumpton | 17/32 |
| 3,480,449 | 11/1969 | Sumpton | 99/175 |
| 4,148,598 | 4/1979 | Colosimo et al. | 425/464 |
| 4,205,415 | 6/1980 | Orchard | 17/32 |
| 4,207,281 | 6/1980 | Bernard | 264/176 |
| 4,257,145 | 3/1981 | Bovino | 17/32 |
| 4,258,066 | 3/1981 | Bernard | 426/231 |
| 4,293,979 | 10/1981 | Colosimo et al. | 17/32 |
| 4,379,356 | 4/1983 | Geissbühler | 17/45 |
| 4,483,046 | 11/1984 | Briddel | 17/32 |
| 4,530,132 | 7/1985 | Wagner | 17/45 |
| 4,614,489 | 9/1986 | Juravic | 425/376 |
| 4,731,006 | 3/1988 | Freda et al. | 17/32 |

Primary Examiner—Willis Little
Attorney, Agent, or Firm—Hovey, Williams, Timmons & Collins

[57] ABSTRACT

An apparatus for shaping a flowable product such as meat is provided which includes a main body or structure having a plurality of forming passageways extending therethrough. An inlet gate and an opposing outlet gate are positioned at opposite ends of the passageways. The inlet gate side of the body is adapted for coupling to a source of meat for delivery of the meat under pressure through the inlet gate of the body. Means is also provided for selectively and sequentially shifting the inlet gate and the outlet gate between open and closed positions. The passageways include means for adjusting the flow of meat therethrough. In operation, the meat product is forced under pressure from the meat source toward and through the main body, while the endmost gates are sequentially operated so that, in cooperation with the adjustment means provided in each passageway, a uniform meat product with squared ends is produced. In addition, the operation of the inlet gate assures even flow of meat product through the passageways by preventing the buildup of obstructive meat fibers at the inlet end thereof.

7 Claims, 2 Drawing Sheets

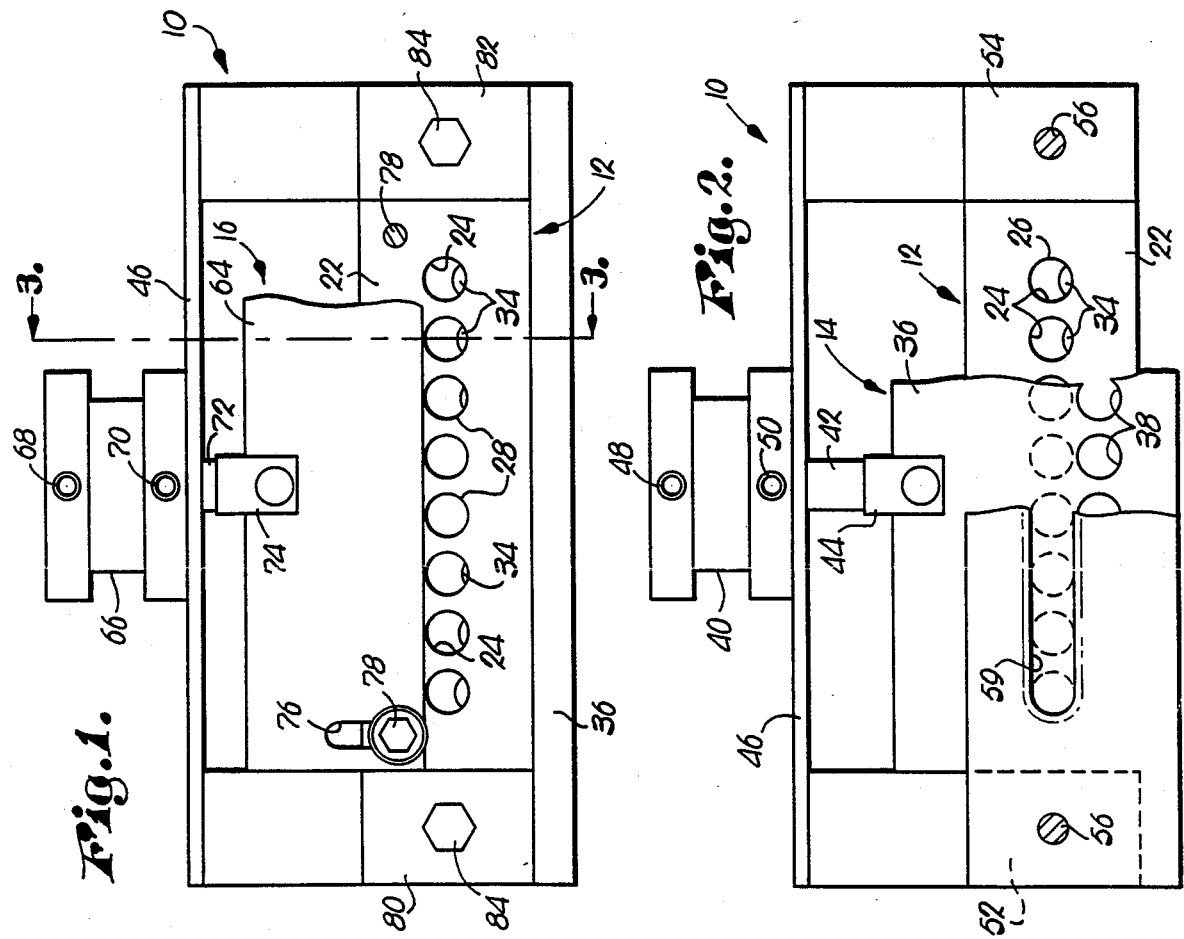

DOUBLE-GATED EXTRUSION DIE FOR SAUSAGE LINKS

BACKGROUND OF THE INVENTION

1. Field of the Invention

This invention relates to an apparatus for shaping a meat product in a continuous extrusion process to provide uniformly sized and shaped final food product.

2. Description of the Prior Art

In the manufacture of food items such as sausages and other meat products, control over the ultimate size and shape of the product is of great importance. Size and shape of the final meat product are interrelated, since control of the shape allows a processor to have better control over the size of individual product portions. Uniformity in shape of final product contributes to uniformity in product size. This has importance both for quality and cost control, and for the appeal of the final product to purchasers in the marketplace.

In an attempt to promote uniformity in size and shape, meat product processors have used a variety of structures. These structures include extruders and formers of varying kinds, some of which feature simple slicing mechanisms for sectioning a stream of meat product. Other devices for controlling the size and shape of meat product portions have included the concept of feeding meat product through a series of passageways under pressure. In these structures, however, only an outlet gate with an operable opening and closing mechanism is provided, for the purpose of chopping or sectioning streams of meat product.

Even the most sop sophisticated of previous structures, including those having an outlet gate, have produced a final product which is less than fully desirable. The absence of an inlet gate allowed collection of meat fibers at the opening of meat passageways, so that unrestricted flow of meat could not be assured. In addition, the opening and closing of the outlet gate for sectioning while meat continued to enter the passageways under pressure resulted in the creation of a "tail" on most of the individual meat product portions. The misshaping of such portions in this fashion was an unfavorable result, because of its negative impact upon the consumer. Additionally, the inability to properly control the flow of meat product through the opening of the meat passageways, and to squarely cut the product stream into uniform sections, severely restricted the ability of meat processors to control the product so produced.

Accordingly, one of the objects of the present invention is to provide an apparatus for more accurately controlling the flow of meat product into extrusion passageways.

A further object of the present invention is to provide means within the extrusion passageways for independently controlling the flow of meat product therethrough so as to encourage uniform flow in each such passageway.

A further object of the present invention is to provide an apparatus for the controlled operation of opposing inlet gates and outlet gates defining meat extrusion passageways, so that the flow of meat product therethrough can be more accurately controlled.

Yet another object of the present invention is to provide an apparatus for shaping meat product in a manner that results in uniform size and shape of individual meat products.

SUMMARY OF THE INVENTION

According to the principles of the instant invention, in an apparatus for shaping the meat product, there is provided a body having extrusion passageways therethrough. Independently operable inlet and outlet gates are provided at opposite ends of the extrusion passageways. Meat product is fed through the inlet opening of the passageways under pressure by a meat source coupled to the inlet end of the body. Appropriate sequenced operation of the inlet and outlet gates yields individual meat product in uniform size and shape, with the timing of gate operation serving to give products of desired length.

Particularly advantageous with regard to the present invention is the effect of the sequenced operation of the inlet and outlet gates. Proper sequencing of the gates insures that the inlet gate is closed prior to the closing of the outlet gate. In this fashion, pressure on the meat source is restricted, so that the uniform sectioning or cutting of individual portions is achieved.

Uniform size and shape of final meat product is assured in the present invention by the cooperative function of inlet and outlet gates, along with individual adjustment means provided in each extrusion passageway.

DESCRIPTION OF THE DRAWING FIGURES

FIG. 1 is an end view of apparatus made pursuant to the present invention, illustrating the outlet end thereof and with parts broken away for clarity;

FIG. 2 is an end elevational view of apparatus made in accordance with the present invention, illustrating the inlet end thereof and with parts broken away;

FIG. 3 is a fragmentary, cross-sectional view taken along line 3—3 of FIG. 1, showing the apparatus of the present invention, including an extrusion passageway and product flow adjustment means therein;

FIGS. 4–7 are fragmentary, cross-sectional views of the present invention, illustrating the successive steps of opening and closing the inlet gate and outlet gate thereof.

DESCRIPTION OF THE PREFERRED EMBODIMENT

Figure 8:
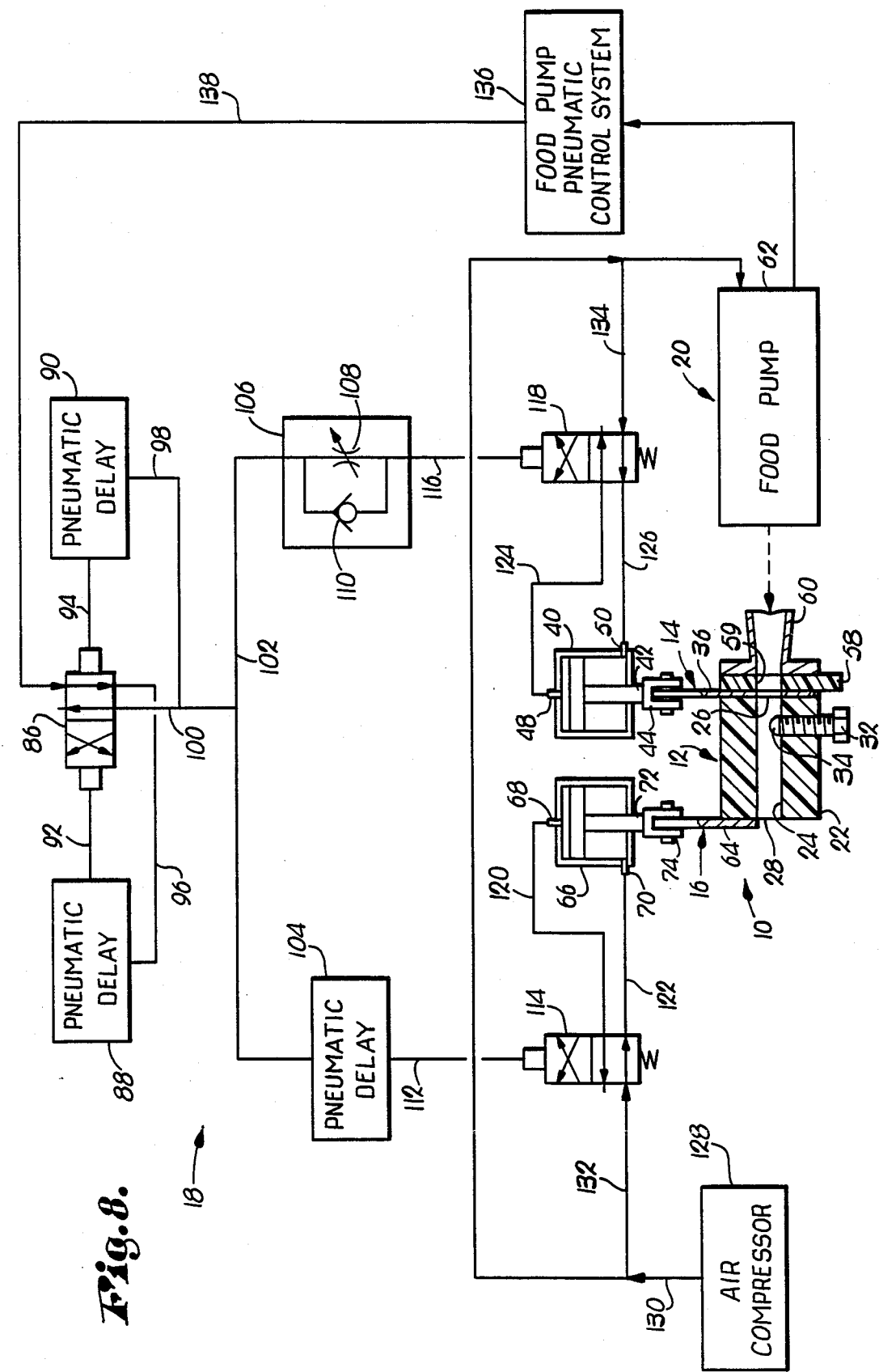
FIG. 8 is a schematic representation of the pneumatic circuitry adapted for use with the present invention for sequenced gate control.

Turning now to the drawings, a product forming device 10 in accordance with the invention is illustrated in FIGS. 1-3. Broadly speaking, the device 10 includes a central product-forming body 12, respective, sequentially operable inlet and outlet gate assemblies 14, 16, means broadly referred to by the numeral 18 for selective control of gate operation (See FIG. 8), and product pumping assembly 20 operably coupled to the inlet end of body 12.

In more detail, the product-forming body 12 includes an elongated, somewhat rectangular in cross-section synthetic resin block 22 provided with a series of elongated, side-by-side product-forming passageways 24 therethrough, each passageway presenting an inlet end 26 and a corresponding outlet end 28. In addition, the block 22 is provided with a series of vertically oriented, threaded bores 30 respectively associated and communicating with a corresponding passageway 24. A threaded plug member 32 is situated within each passageway as best seen in FIG. 3, the plug including a rounded uppermost end 34 which is important for reasons to be explained.

The inlet gate assembly 14 includes an elongated, metallic, apertured plate 36 which is situated adjacent the right-hand end of block 22 as best seen in FIG. 3. As illustrated, the plate 36 is provided with a total of eight openings 38 therethrough, which are oriented for alignment with the ends 26 of the passageways 24. Vertical shifting movement of the plate 36 is afforded by means of a pneumatic piston and cylinder assembly 40, the rod 42 thereof being secured to the upper end of plate 36 by means of clevis 44. As illustrated, the cylinder 40 is situated atop support plate 46, forming the part of the overall device 10. The assembly 40 is entirely conventional, and includes the usual pneumatic couplers 48, 50, permitting attachment of the assembly 40 to an operative pneumatic circuit.

Up and down sliding motion of the plate 36 is guided by means of a pair of laterally spaced apart, upright blade guides 52, 54 affixed to the inlet face of block 22 by means of bolts 56.

The inlet end of the product-forming body 12 also includes an upright, horizontally slotted (as at 59), synthetic resin adapter plate 58 also secured to the block 22 by means of the bolts 56. It will be observed that the slot 59 is oriented in registry with the inlet ends 26 of the respective passageways 24. The device 10 further includes a delivery horn 60 operatively coupled to adapter plate 58 for delivery of meat. The horn 60 is in turn operably coupled with a pump 62 later to be described. In this respect, that adaptor plate 58 is spaced sufficiently from the adjacent inlet face of block 22 so as to permit clearance for the up and down shifting movement of plate 36.

The outlet gate assembly 16 includes an upright, metallic, vertically shiftable plate 64 which is used for selective opening and closing of the outlet ends 28 of the passages 24. Up and down movement of plate 64 is governed by piston and cylinder assembly 66 with the usual pneumatic couplers 68, 70 and operating rod 72. As best shown in FIG. 1, the lower end of rod 72 is coupled to plate 64 by means of clevis 74. The movement of plate 64 is guided by means of a pair of slots 76 through the plate, which receive corresponding guide bolts 78. In addition, such movement is further guided by means of laterally spaced apart, upright guide members 80, 82, affixed to the outlet end of block 22 by means of bolts 84.

Turning now to FIG. 8, the preferred control means 18 is illustrated in schematic format. The gate control means 18 is designed to control the sequential operation of the gate members 36 and 64, in a manner to assure production of link products of essentially identical size and shape, and all with desirable square-cut ends. The assembly 18 includes air logic flip-flop element 86 coupled to a pair of conventional pneumatic delays 88, 90 by means of pneumatic pilot lines 92, 94. A line 96 from delay 88 leads to one output of flip-flop 86, and second line 98 from delay 90 is coupled with a line 100. The line 100 is in turn connected with a second outlet of flip-flop 86 and also to a branch line 102. Line 102 is coupled at one end thereof to a third pneumatic delay 104, whereas the other end thereof is coupled with a flow control element 106, the latter having an adjustable flow-control orifice 108 and a by-pass check valve 110.

A line 112 leads from pneumatic delay 104 to the pilot of spring biased, four-way directional control valve 114. On the other hand, a line 116 from the element 106 to the pilot of another four-way directional control valve 118 is shown in FIG. 8.

A first valve line 120 extends between a port of valve 114 and the corresponding coupling 68 of piston and cylinder assembly 66; similarly, a line 122 extends between coupler 70 of assembly 66 and a second port of the valve 114. A valve line 124 extends between coupler 48 of piston and cylinder assembly 40 and a port of valve 118, with a second valve line 126 extending between and being coupled to another port of valve 118 and coupler 50 of assembly 40.

The overall assembly 18 further includes a conventional air compressor 128 equipped with an output line 130 extending to and being coupled with food pump 62. Respective branch lines 132 and 134 are connected to output line 130 and are in turn connected to the input ports of the valves 114, 118 as shown. Food pump 62 later to be described includes a conventional pneumatic control system schematically referred to by the numeral 136. The output of this system is coupled via line 138 to a port of flip-flop 86.

In the orientation of assembly 18 depicted in FIG. 8, of the inlet and outlet gates 14, 16 are in their elevated positions, and product is flowing from pump 62 through the elongated passageways 24. In order for this condition to obtain, compressed air from compressor 128 and line 130 is fed to pump 62 and ultimately to pneumatic control system 136. Such compressed air then passes through line 138 to flipflop 86, thereupon through line 96 to pneumatic delay 88. After an appropriate delay governed by the setting of pneumatic delay 88, the delay passes a pneumatic signal through line 92 to a pilot of flip-flop 86, thereby shifting the flip-flop. At this point, compressed air from line 138 passes through lines 100 and 98 to pneumatic delay 90 and also to delay 104 and flow-control element 106. At this point, the compressed air passes through line 116 to the pilot of valve 118, thereby shifting the valve and allowing compressed air from branch line 134 to pass through the valve 118 into line 124 and to coupler 48 of piston and cylinder assembly 40. This in turn causes the inlet gate 14 to close, moving the apertures 38 thereof out of registry with the inlets 26 of respective passageways 24. This isolates the passageways 24 from the mass of material being pumped by pump 62.

During the next step of sequential operation of the gate assemblies 14, 16, pneumatic delay 104 operates (again, according to its setting) to pass compressed air via line 112 to the pilot of valve 114, thus shifting the latter. This in turn causes compressed air from line 132 to pass through line 120 to coupler 68, whereupon the piston of assembly 66 is shifted downwardly, closing gate 16.

In the next step, pneumatic delay 90 operates by passing compressed air through line 94 to the pilot of flip-flop 86, thereby shifting the latter back to the position depicted in FIG. 8. Inasmuch as delay 104 and the flow-control element 106 are no longer pressurized, the spring of valve 114 operates to shift valve 114 back to its FIG. 8 position. This serves to pressurize line 122, thereby effecting raising of outlet gate 16. The operation of inlet gate 14 is delayed by virtue of flow-control element 106 so that the gate 14 opens after the gate 16. After such delay, it will be seen that the spring associated with valve 118 serves to bias the valve 118 to its FIG. 8. This in turn couples lines 134 and 126, so as to raise inlet gate 14.

It will, of course, be appreciated that the length of the product portions is controlled by the timing of gate operation, and not by the length of the passageways 24. This gives a desirable measure of flexibility to the forming device 10.

The preferred product pumping assembly 20 in accordance with the invention is the twin-piston, reciprocable sleeve food pump commercialized by Marlen Research Corporation of Overland Park, Kans. Pumps of this type are disclosed in U.S. Pat. Nos. 3,456,285; 4,097,962; and 4,700,899; all of these patents are incorporated by reference herein.

To better understand the sequential effect of operation of the inlet and outlet gate assemblies 14, 16, attention is specifically directed to FIGS. 4-7. In particular, it is a goal of the present invention to provide successively formed links or other bodies of substantially identical size and shape, and all without characteristic tapered end or "tail" associated with machine forming of such products. To this end, and as apparent from the aforementioned description of operation of the gate control means 18, the initial phase of operation illustrated in FIG. 4, both of the inlet and outlet gates 14–16 are in an elevated position, i.e., the openings 38 of plate 36 are in registry with the inlet ends 26 of the passageways 24, and plate 64 is elevated to a position completely clearing the outlet ends 28 of the passageways. In this orientation, it will be observed that the mass of material pumped via pump 62 unrestrictedly passes towards and through the passageways 24, thereby creating an ejected link or product portion adjacent the outlet end of block 22, while maintaining the passageways full of product.

In the next operational step shown in FIG. 5, the inlet gate 14 is shifted downwardly, so that the openings 38 are out of registry with the passageways 24. In addition, product within the passageways 24 is isolated from the pressurized mass of product from pump 62. After the inlet gate is fully closed, the outlet gate assembly 16 operates to lower plate 64. This has the effect of cleanly severing the ends of the portions without the objectionable "tail" encountered in prior art devices. Noteworthy in this respect is that this product severing occurs while the material within the passageways 24 is isolated from the pressurized mass of product from pump 62. This severing action is specifically illustrated in FIG. 6.

In the next step (see FIG. 7), the outlet gate is raised, so that plate 64 assumes its elevated position. Finally, the inlet gate 14 is operated so as to return the openings 38 into registry with the passageways 24, whereupon the overall assembly again assumes the configuration of FIG. 4.

Inasmuch as product from pump 62 passes through the horn 60, of somewhat flattened, elongated endmost configuration, it sometimes occurs that differential flow characteristics are observed in certain of the passageways 24. This can create problems for the processor, inasmuch as the differential flow may yield different sized portions from respective passageways. In order to overcome this problem, the plugs 32 are manipulated by simple rotation thereof so that the rounded ends 34 thereof can be moved to a greater or lesser extent in the confines of the associated passageways 24. This in turn presents a flow restriction of greater or lesser extent in the corresponding passageways, thereby affording a simple means of adjusting the flow and volume of material through the passageway in question. In this manner, the operator can precisely adjust the device 10 so as to get identical products from all passageways.

In addition to the foregoing, it has been discovered that use of an inlet gate in the manner of assembly 14 provides an important operational advantage. Specifically, experimentation with devices not equipped with an inlet gate demonstrate that, over a relatively short period of time, meat fibers tend to "bridge" between adjacent passageways in the block 22, thereby creating flow restrictions and other problems However, by virtue of the reciprocating inlet gate assembly 14, the ends 28, 26 of the passageway 24, and the regions between respective passageways, are continually wiped clean so as to prevent undue accumulation of meat in these regions.

We claim:

1. Apparatus for shaping a flowable product, comprising:
    a body presenting an inlet face and an opposed outlet face, and a plurality of individual product-shaping passageways through the body and communicating with said faces to present inlet and outlet ends for the passageways;
    an inlet gate adjacent said inlet face and selectively shiftable between an open position wherein said passageways are open, and a closed position closing the inlet ends of said passageways;
    an outlet gate adjacent said outlet face and selectively shiftable between an open position wherein said passageways are open, and a closed position closing the outlet ends of said passageways;
    structure for coupling of said body to a source for delivery of flowable product to the inlet ends of said passageways; and
    means operably coupled with said inlet gate and said outlet gate for selective shifting thereof between said gate open and gate closed positions.

2. The apparatus as set forth in claim 1, said gate-shifting means including structure for first shifting said outlet gate from the gate closed to the gate open position, whereupon said inlet gate is moved from the gate closed to the gate open position to expose said passageways to said product source, whereupon said inlet gate is moved from the gate open to the gate closed position and thereafter said outlet gate is moved from the gate open to the gate closed position.

3. The apparatus as set forth in claim 1, including means associated with each passageway respectively for adjusting the amount of product passing through the passageways.

4. In an apparatus for shaping a flowable product including a body having an inlet face and an opposed outlet face, and a plurality of individual meat shaping passageways through the body and communicating with said faces, each said passageway including means operable to adjust the flow of product therethrough whereby the products emanating from said passageways are of uniform size and shape, said flow adjusting means comprising a flow restricting element for each passageway, and means shiftably mounting each element adjacent a corresponding passageway for selective movement of each element into its corresponding passageway for varying the flow of meat therethrough.

5. A method of forming a flowable product into successive portions of predetermined shape and length comprising the steps of:

(a) providing a forming zone including structure defining an elongated product shaping passageway presenting an inlet end and an outlet end;

(b) moving a mass of said product under pressure towards and through said passageway for forming and ejecting from the passageway a product portion while leaving the passageway filled with product;

(c) closing the inlet end of said passageway for isolating the product within the passageway from the pressurized mass of said product being moved toward the passageway;

(d) thereafter closing the outlet end of said passageway and completing the formation of said product portion while said passageway remains filled with said product;

(e) then opening the outlet end of said passageway;

(f) thereupon opening the inlet end of the passageway to expose the passageway, and the product contained therein, to said pressurized mass of material, for ejecting another product portion from the passageway and refilling the passageway with product; and (g) repeating steps (c) through (f) to successively form said product portions.

6. The method as described in claim 5, said product being meat.

7. The method as described in claim 5, including the step of opening and closing said passageway ends in timed relation to give product portions of said predetermined length.

* * * * *